US006684709B2

(12) United States Patent
Johnson

(10) Patent No.: US 6,684,709 B2
(45) Date of Patent: Feb. 3, 2004

(54) PRESSURE TRANSDUCER WITH CAPTURED NON COMPRESSIBLE LIQUID VOLUME DEFINING NEUTRAL CONDITION

(76) Inventor: Dwight N. Johnson, 6361 Yarrow Dr., Carlsbad, CA (US) 92009

( * ) Notice: Subject to any disclaimer, the term of this patent is extended or adjusted under 35 U.S.C. 154(b) by 32 days.

(21) Appl. No.: 10/074,748

(22) Filed: Oct. 29, 2001

(65) Prior Publication Data

US 2003/0079546 A1 May 1, 2003

(51) Int. Cl.[7] .............................................. G01L 15/00
(52) U.S. Cl. ............................. 73/716; 73/700; 73/715
(58) Field of Search ........................... 73/716, 700, 715

(56) References Cited

U.S. PATENT DOCUMENTS 4,546,785 A * 10/1985 Sanderford ................... 137/85
4,817,629 A * 4/1989 Davis et al. ................. 600/561

* cited by examiner

Primary Examiner—Edward Lefkowitz
Assistant Examiner—Alandra Ellington
(74) Attorney, Agent, or Firm—Spencer T. Smith

(57) ABSTRACT

A pressure transducer which has a closed chamber which is full of oil or other non-compressible liquid. Pressure communicates with a diaphragm which defines one side of the closed chamber and the pressure communicates via the oil with a pressure sensor which is mounted within the oil spaced from the diaphragm. The liquid entered the closed chamber through a inlet hole with a selected volume driven into the closed chamber by a ball which is forcefully driven a selected distance into the inlet hole before stopping at the end of the inlet hole against a physical stop.

3 Claims, 4 Drawing Sheets

PRESSURE TRANSDUCER WITH CAPTURED NON COMPRESSIBLE LIQUID VOLUME DEFINING NEUTRAL CONDITION

The present invention relates to pressure transducers for sensing the pressure of a fluid being conveyed in a pipe.

BACKGROUND OF THE INVENTION

A pressure transducer conventionally includes a piercing needle which can be advanced to engage and pierce a clamped pipe which is carrying fluid under pressure. The pressurized fluid flows through the pierced hole and communicates with a solid state pressure sensor which can supply sensed pressure data to an electronics package for computational or other use.

OBJECT OF THE INVENTION

It is an object of the present invention to provide such a pressure transducer wherein the sensor is isolated in an inert protective fluid which transmits the pressure to the sensor.

Other objects and advantages of the present invention will become apparent from the following portion of this specification and from the accompanying drawings which illustrate, in accordance with the mandate of the patent statutes, a presently preferred embodiment incorporating the principles of the invention.

BRIEF DESCRIPTION OF THE PREFERRED EMBODIMENT

Figure 1:
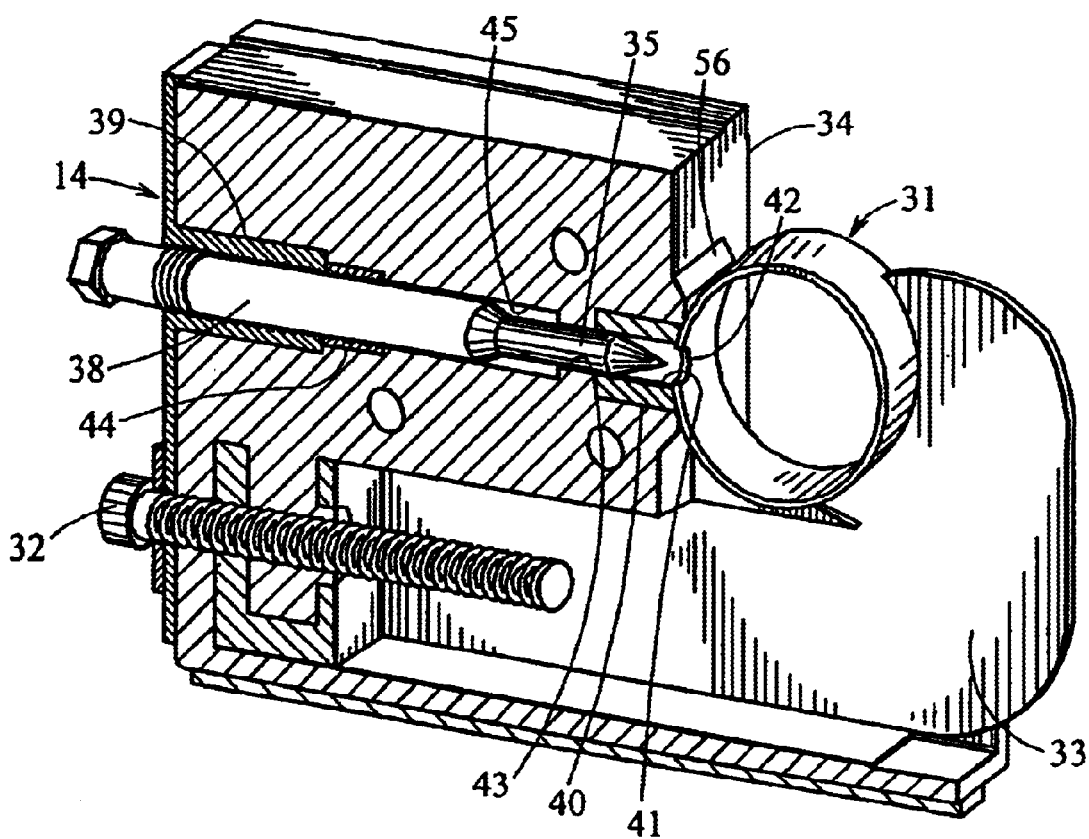
FIG. 1 is an oblique view, partly in section, of a temperature/pressure transducer, made in accordance with the teachings of the present invention, clamped to a water pipe.
Figure 2:
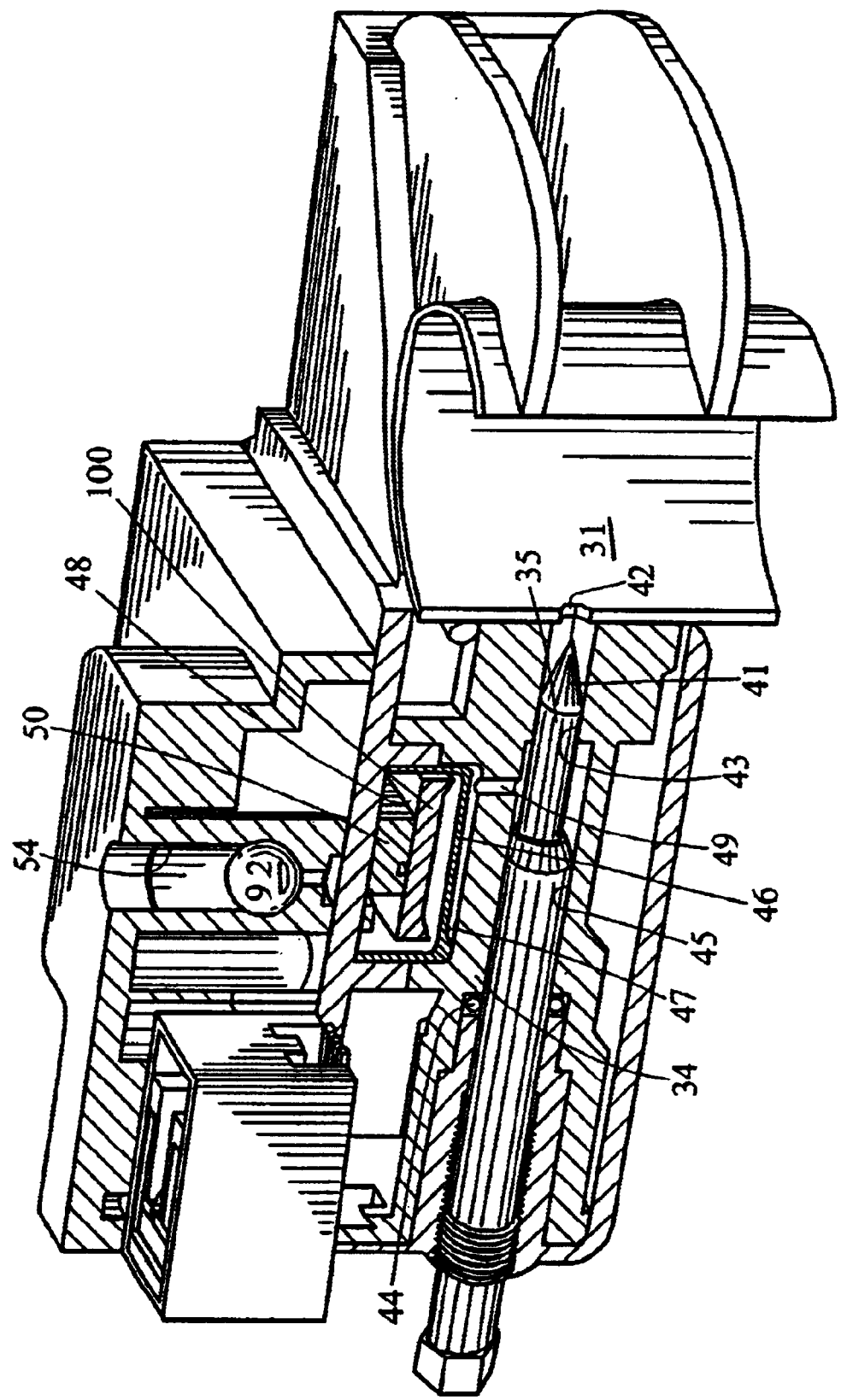
FIG. 2 is another oblique view, partly in section of the temperature/pressure transducer shown in FIG. 1.

FIGS. 1 and 2 illustrate a pressure/temperature transducer P/T 14 which is clamped onto a water pipe 31 much like a saddle valve, by tightening a clamping bolt 32 to advance a jaw 33 to clamp the housing 34 to the water pipe proximate a piercing needle 35. Once clamped, the piercing needle can be extended until the pipe wall is pierced, by rotating the body 38 of the piercing needle, which is threadedly received by an internally threaded sleeve 39 in the housing 34 of the pressure sensing device. Surrounding the piercing needle, proximate the pipe is an annular compression seal 40, which effectively seals the pierced hole 42. The compression seal 40 has a through hole 41 larger than the piercing needle. A second seal 44 seals the body 38 of the piercing needle and the housing bore 45 in which the body moves. When the piercing needle is retracted, water will pass through the pierced hole 42, through the hole in the compression seal 41, through a needle guide hole 43 in the housing, into the housing bore 45 along the piercing needle and through a hole 49 (FIG. 2) into a chamber 47 between the housing 34 and a flexible diaphragm 46, which also defines the bottom of an upper sealed chamber 48 in which a solid state pressure sensor 50 is located. The housing additionally supports a temperature sensor (thermistor, for example) 56 that is clamped against the pipe wall when the housing is clamped in position.

Figure 3:
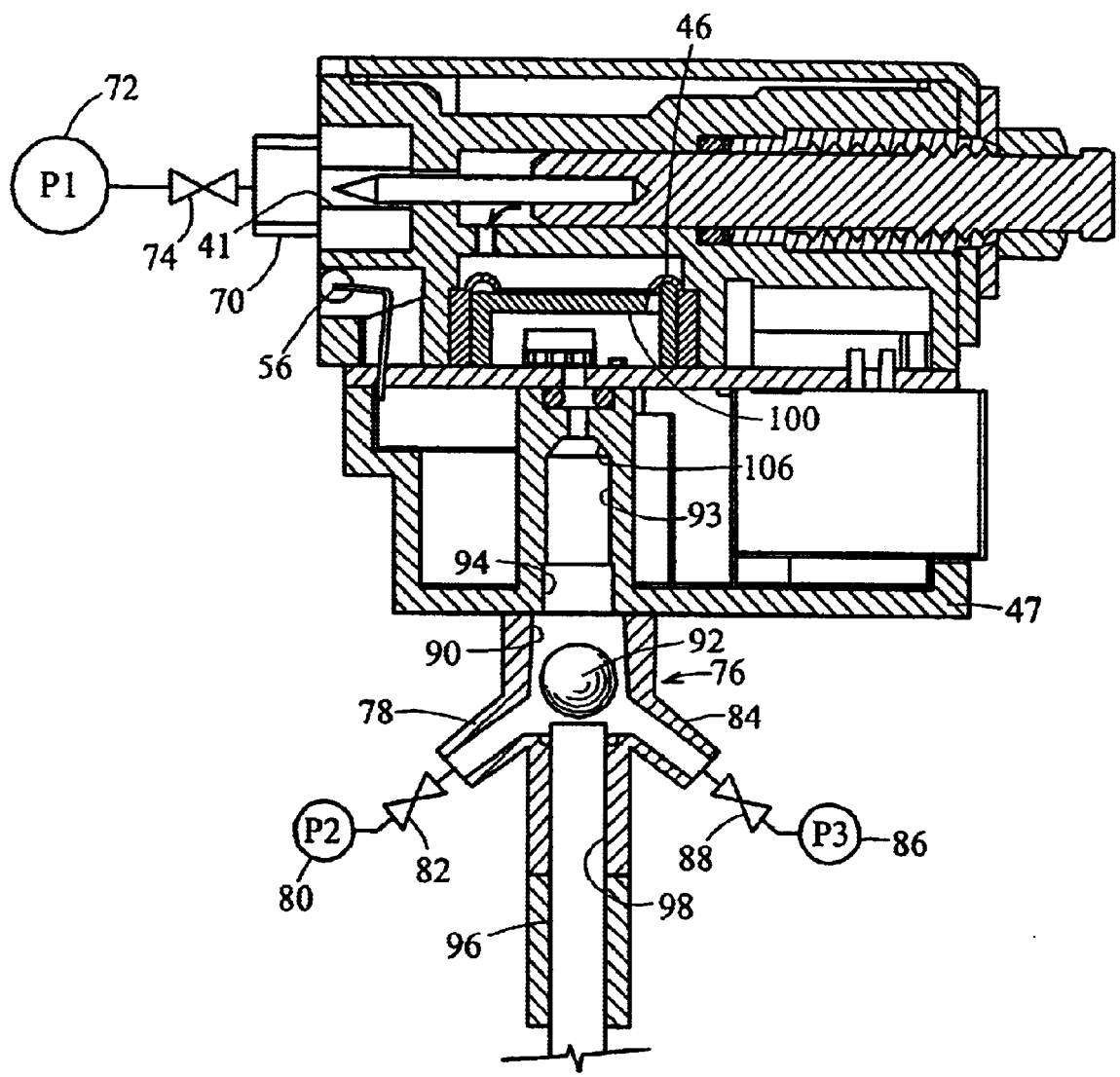
FIG. 3 is a cross sectional view of the pressure/temperature sensing module schematically assembled with structure for loading the module with oil.

Oil, such as silicone oil, is permanently captured within this chamber in the manner shown in FIG. 3. A first port 70 is connected to the housing 34 at the compression seal bore 41 by establishing a suitable face seal, for example. This port is connected to a source of diaphragm preload pressure P1/72 (10–20 PSI) and the pressure source can be turned on and off with a suitable valve 74. A chuck 76 is also connected to the housing 34 at the fill hole 54 by establishing a suitable face seal, for example. The chuck has a first port 78 which is connected to a source of oil under pressure P2/80 and this pressure source can be turned on and off with a suitable valve 82. The chuck has a second port 84 which is connected to a source of vacuum P3/86 and the vacuum source can be turned on and off with a suitable valve 88. The chuck has an exit bore 90 for receiving a metallic sealing ball 92 which is sized to be larger than the reduced diameter portion 93 of the oil inlet hole. The juncture of the reduced diameter portion and an enlarged diameter portion 94 of the oil inlet hole defines the location in the hole where the reduced diameter portion will be sealed by the ball. The chuck also supports a displaceable plunger 96 which is sealed within its hole 98 and which will not move when P2 is applied (rearward displacement past the shown position may be prevented with a key/keyway interconnection, for example).

Figure 4:
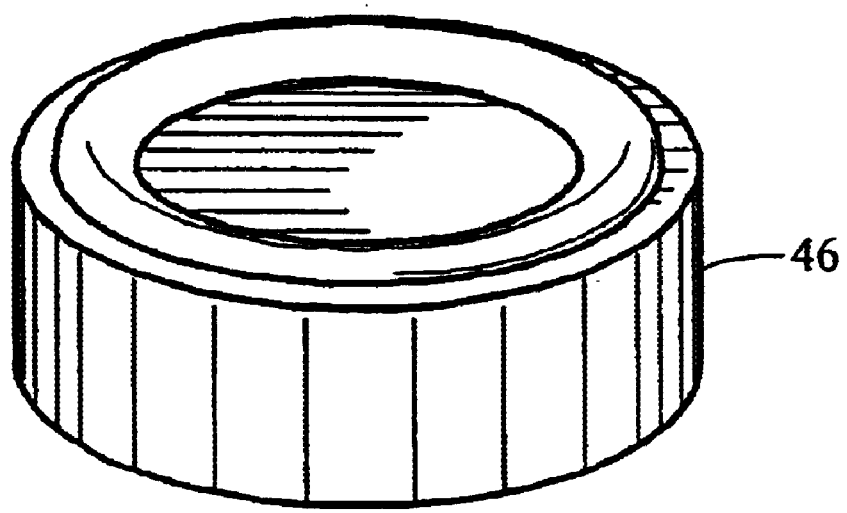
FIG. 4 is an oblique view of the diaphragm as shown in FIG. 3.
Figure 5:
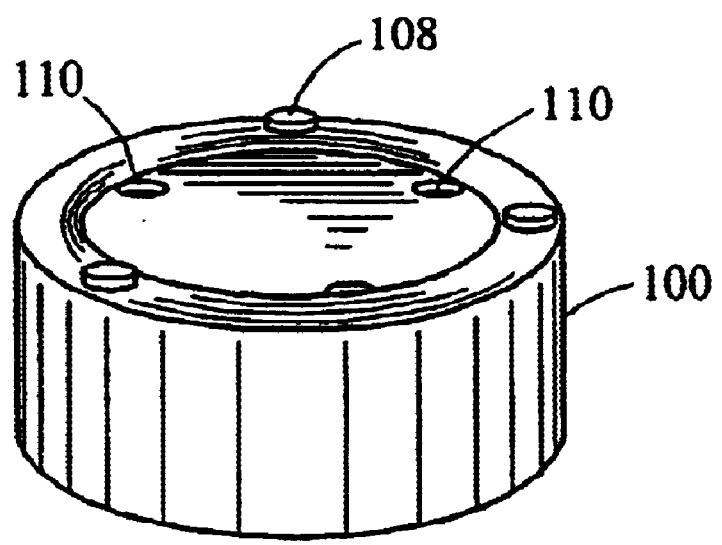
FIG. 5 is an oblique view of the support cup shown in FIG. 3.

With valves 82 and 88 closed and valve 74 open P1 is applied to deflect the top of the diaphragm 46 down against a support cup 100. FIG. 4 illustrates the diaphragm at this time and FIG. 5 illustrates the support cup. Now, valve 88 is opened and vacuum is applied to eliminate all the air intermediate the diaphragm and the valve. When this is complete valve 88 is closed and valve 82 is opened to fill the space between the diaphragm and the valve with oil. P2 is less than P1 so that the top of the diaphragm will not move off the support cup. When this is complete, valve 82 is closed and the plunger is displaced axially by an air cylinder, for example, to forcefully displace the ball to its final position at the end of the reduced diameter of the oil inlet hole against the tapered surface 106. The volume of oil pushed into the system as the ball is displaced from the juncture of the enlarged and reduced diameter portions to the end of its displacement is a defined volume which is chosen to deflect the top of the diaphragm to its original flat neutral condition (oil will flow through holes 110 in the support cup and a number of nubs 108 will facilitate the separation of the diaphragm from the support cup). When the pre load inlet and chuck are removed, the diaphragm will be ideally neutral and no pressure will be transmitted from the diaphragm, across the oil to the pressure sensor. The module can be calibrated by determining the sensed pressure after assembly. The spacing between the neutral diaphragm and the support cup is sufficient so that any sensed pressure will not be sufficient to push the diaphragm against the support cup. Accordingly, any pressure applied to the diaphragm will be transmitted through the noncompressible oil to the sensor and will be read by the system.

What is claimed is:

1. A pressure transducer comprising
   a closed chamber having a diaphragm defining one side,
   a pressure sensor mounted within said closed chamber with a space separating the pressure sensor and said diaphragm, an inlet bore communicating with said closed chamber including an outer enlarged diameter portion, a first reduced diameter portion extending a selected distance inwardly from said enlarged diameter portion towards said closed chamber terminating at a second further reduced diameter portion, a ball wedged into said first reduced diameter portion against said second further reduced diameter portion, and a non-compressible liquid filling said closed chamber, said diaphragm being in the relaxed state.

2. A pressure transducer according to claim 1, further comprising support cup means including a flat base, said support cup means being mounted within said closed chamber with said flat base parallel to and selectively spaced from said diaphragm.

3. A pressure transducer according to claim 2, further comprising pressure supply path means for delivering fluid pressure from a hole in a pressurized pipe to said diaphragm including a piercing needle, support means for supporting said piercing needle for displacement into a pipe to pierce the pipe, and bore means extending from a first location surrounding the piercing needle to a second location communicating with said diaphragm.

* * * * *